Figure 1:
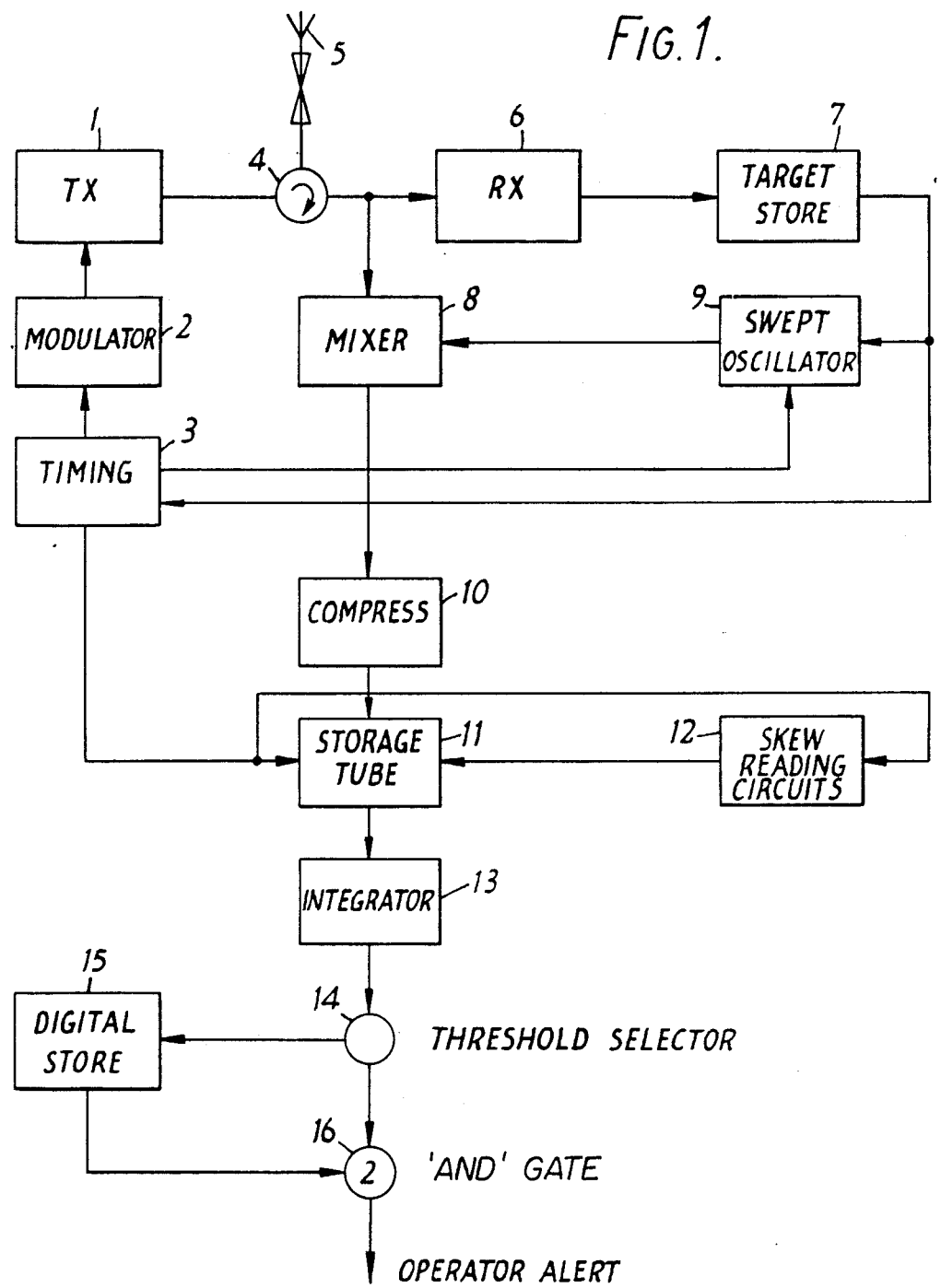

United States Patent [19]

Voles

[11] Patent Number: 4,857,934

[45] Date of Patent: Aug. 15, 1989

[54] TARGET DETECTORS

[75] Inventor: Roger Voles, London, England

[73] Assignee: Electrical & Musical Industries Limited, Hayes, England

[21] Appl. No.: 801,211

[22] Filed: Feb. 20, 1969

[51] Int. Cl.³ ............................................. G01S 13/58
[52] U.S. Cl. .................................... 342/90; 342/109; 342/132
[58] Field of Search .........343/50 P, 8, 17.1, 17.2 PC; 342/90, 107, 109, 132

[56] References Cited

U.S. PATENT DOCUMENTS 3,333,267 7/1967 Williams ........................... 343/17.1
3,353,177 11/1967 Wilmot .......................... 343/5 OP
3,898,659 8/1975 Jensen et al. ........................ 342/109

Primary Examiner—T.H. Tubbesing
Attorney, Agent, or Firm—Fleit, Jacobson, Cohn & Price, Holman & Stern

[57] ABSTRACT

In an improved target detector, echo signals received from the same range bracket on successive scans of the same angular direction are stored. Different combinations of elements from said echo signals are sampled and integrated, each combination being chosen to include elements indicative of a target moving with a particular velocity. Different combinations are indicative of different target velocities, or of targets situated at different initial ranges, and means are provided for signalling an alarm when the integral of any combination exceeds a threshold.

7 Claims, 4 Drawing Sheets

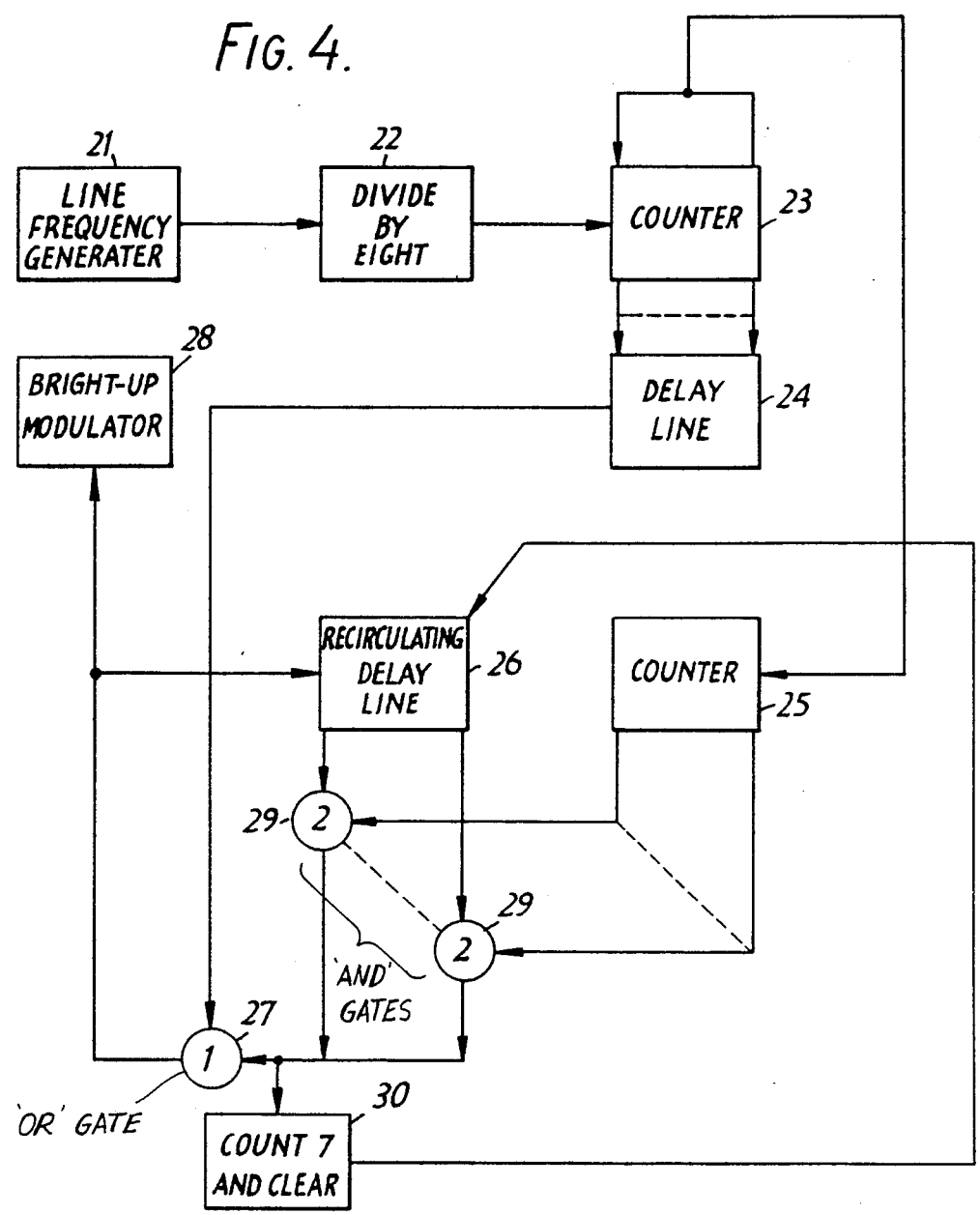

TARGET DETECTORS

This invention relates to target detectors for radar and like systems and is especially but not exclusively suitable for the detection by radar of small targets in the midst of clutter.

The detection of small targets on the surface of the sea by means of radar is rendered difficult by the signals produced by reflections from waves and it is usual to analyze the radar returns in some way so as to classify different sources of echoes. Such classification tends however to be difficult where the radar is carried by an aircraft moving at a relatively high speed since only a short time may be available for initial classification.

The object of the present invention is to provide an improved target detector, especially for use with radar apparatus which can achieve classification from a relatively small number of returns.

Another object of the invention is to provide improved target detection apparatus which can effect classification from radar echo signals without interrupting high speed scanning of the radar aerial.

According to the present invention there is provided a target detector, including means for storing signals representing echoes received from the same range bracket and from substantially the same direction, means for integrating different combinations of elements from said echo signals, each combination being selected to include the elements which would correspond to a target moving with a particular velocity, and different combinations representing different velocities or different initial ranges, and means for signalling when the integral of any combination exceeds a threshold which indicates the presence of a target moving with the respective velocity.

Figure 2:
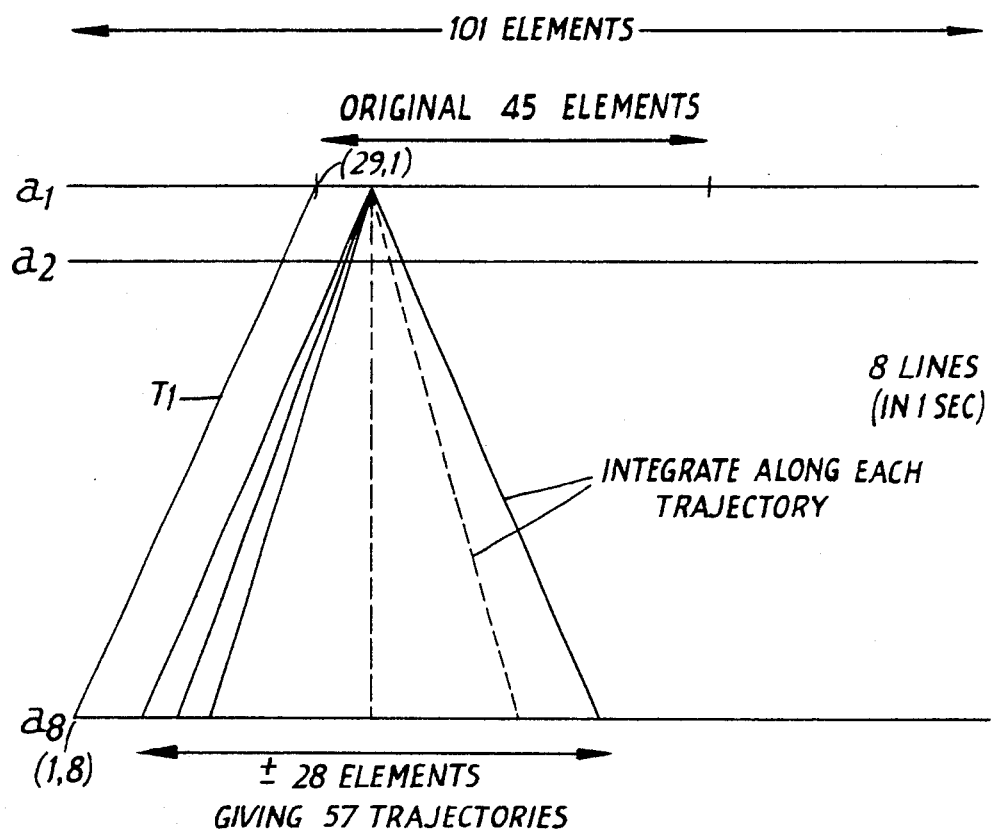
Figure 3:
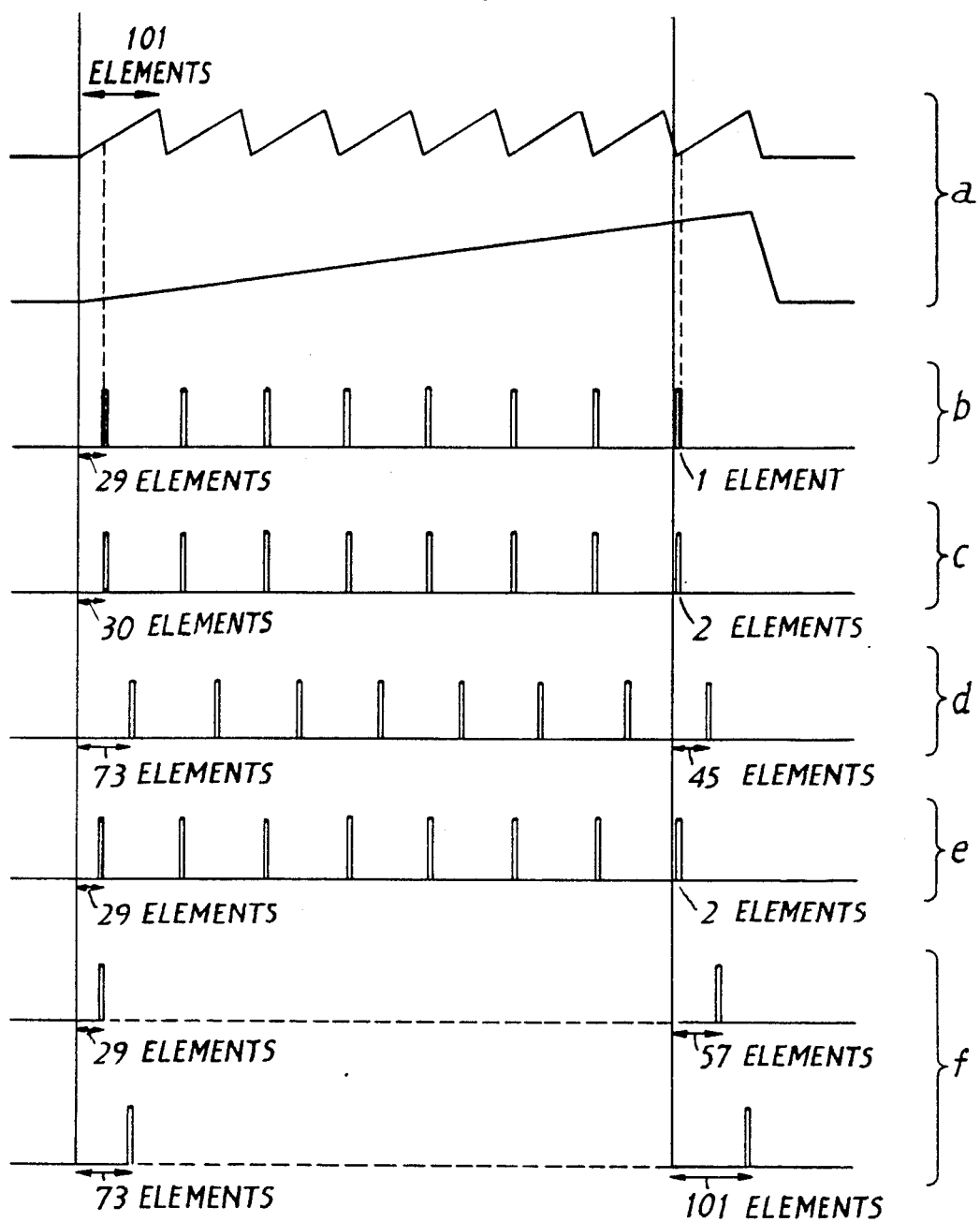

In order that the present invention may be clearly understood and readily carried into effect it will now be described with reference to the accompanying drawings in which:

FIG. 1 shows in block diagrammatic form one example of radar apparatus incorporating a target detector according to the present invention, FIG. 2 shows part of the storage area of a storage tube included in the target detector, FIG. 3 shows waveforms explanatory of the invention, and FIG. 4 is a diagrammatic representation of the scanning circuits associated with the storage tube of the target detector.

In order to increase the resolution of a radar system without using very short pulses and thereby reducing the effective radiated power it has been proposed to use pulses of oscillation of which the frequency if linearly variable. With such pulses, returns from different parts of the pulse can be separated on a frequency basis. A pulse of this kind is known as a chirp pulse. However, to make full use of the range resolution available when using chirp pulses, very wide band receiving circuits are required, and such a wide bandwidth may be difficult to achieve in circuits for analysing the received information. To reduce bandwidth requirements of such a circuit it has been proposed to adopt a technique which is known as "stretch". This technique in effect stretches the time scale of the echoes and in so doing reduces the bandwidth requirement. The technique is described in an article entitled "A Technique for the Time Transformation of Signals and Its Application to Directional Systems" by W. J. Caputi, published in the Radio and Electronic Engineer, dated March 1965. The example of the present invention described below uses the stretch technique to match the resolution of the radar pulses to that of the analysing circuit, for the region of particular interest at any one time. In this way, the analysis of the echoes in order to detect targets having a substantially steady velocity is facilitated.

Referring to FIG. 1 of the drawings, radar pulses are emitted by a transmitter 1 in response to frequency modulated chirp pulses produced by a modulator and waveform generator 2, which operates under the control of a timing circuit 3. The pulses from the transmitter 1 are applied via a circulator 4 to the aerial 5. In the present example, the radar pulses are emitted by the transmitter 1 at a rate of about 4000 per second with a beam width of about 1° and the aerial is a dish rotating at such an angular velocity that about eight pulses are emitted in any one angular direction in one second. Echo signals received by the aerial 5 are directed by the circulator 4 to a receiver 6 which includes an autodetector coupled to a target store 7. The arrangement is such that if the autodetector in the receiver 6 produces a signal indicating the possible presence of a target (a so called alarm) the store 7 stores a representation of the co-ordinates of the possible target. Echo signals from the circulator 4 are also applied to a mixer 8 which is connected to an oscillator 9 so that it can receive a second input, consisting of a sweptfrequency oscillation. The oscillator is controlled by outputs received from the target store 7 in such a way that following each of the next seven radar pulses emitted in the same angular direction as that producing the initial alarm from the receiver 6, a swept frequency oscillation is applied from the oscillator 9 to the mixer 8. The sweep has a lower rate of change of frequency than the chirp pulse and its time duration is the same as the time duration of the transmitted pulse and corresponds to a range bracket to cover all possible positions of the target, at the time of the first echo, together with a margin at both ends to allow for possible movements of the target up to the echo from the last of the eight pulses. Therefore, from each possible target there are produced eight outputs from the mixer 8 and these outputs are applied to a compressor 10 which operates to stretch the time scale of the echo within the range bracket of the oscillation produced by the oscillator 9, as described in the aforesaid article. As explained in the article the stretching of the time scale compresses the bandwidth required to transmit the output of the compressor without loss of intelligence. Since the stretch technique is described in the aforesaid article it will not be described more fully herewith. It will be assumed however that the oscillation from the oscillator 9 is selected in relation to the chirp pulses to compress the bandwidth sufficiently to allow the resolution obtainable from the chirp pulses to be maintained in the analyzing circuits following the compressor 10 notwithstanding a relatively low bandwidth.

The output signal from the compressor 10 is applied in analog form to a storage tube 11 which is a tube of Cathodeon type VX 9259. The line scanning rate of the tube 11 is related to the rate of rotation of the aerial in such a way that the echoes from successive pulses emitted in the same angular direction and bracketed by the oscillator 9 are stored in successive lines of the target of the tube, discrete pulses corresponding to the same elementary range in successive echoes being stored one beneath the other. The target of the storage tube will hereinafter be referred to as the charge area of the tube to distinguish it from the target giving rise to the echoes.

Assume that the range bracketed by the output signal from the target store 7, the resolution of the emitted chirp pulses is adequate to resolve 45 range elements. Assume also that the margin added to this range bracket by the possible movement of the target adds 28 range elements at each end of the initial bracket. Each output of the mixer may therefore include discrete pulses representing an echo received from any one of 101 range elements. As represented in FIG. 2, discrete pulses within the range of 101 elements received in response to the emitted radar pulse giving rise to the first alarm are recorded on the line $a_1$. Discrete echo pulses within the same range bracket received in response to the second emitted radar pulses are recorded on the line $a_2$, and so on to the line $a_8$. It will be understood that the time taken to trace each of the lines $a_1$ to $a_8$ is considerably longer than the time taken for the emitted radar pulse to sweep twice the corresponding range at the velocity of light, the extension of time being produced by the stretch technique which also reduces the bandwidth of the signals applied to the storage tube to a value which is compatible with the parameters of the tube.

After the echo signals from eight radar pulses have been stored in the storage tube as above described, the apparatus is arranged to analyze the stored representations in order to classify the target. As will appear from the following description, the classification is based on a velocity criterion, as well as amplitude, an output signal being produced to alert the operator if the target is found to have any one of a number of substantially uniform velocities. The classification is achieved by sampling the signal elements stored on the charge area along a vertical line of elements or so-called trajectory, representing a stationary target, and along a number of trajectories inclined at different angles to the vertical representing targets moving with different but substantially uniform velocities, and by integrating the sampled signal elements. The sampling is achieved by skew reading circuits 12 which constitute sampling means and are arranged to derive output signals from the charge area of the storage tube, in successive scans of the charge area only from preselected points on the different trajectories, the trajectories being taken in a prearranged order. The signals produced from any one trajectory are fed to an integrator 13 which is cleared after each trajectory has been sampled. The output of the integrator during the sampling of such trajectory is applied to a threshold selector 14 which produces an output signal at AND gate 16 whenever the output of the integrator exceeds a predetermined threshold. It also feeds a signal to a store 15 which sets up a digital signal classifying the target by its velocity.

The circuit for sampling the skew trajectories is shown in FIG. 4.

It is to be assumed that the circuit of FIG. 4 is associated with normal line and field scanning means comprising circuits which produce waveforms for repetitively scanning the charge area along the lines $a_1$ to $a_8$.

Pulses at line frequency from the line frequency generator 21 are applied to a divide-by-eight circuit 22, which may, for example, consist of an eight-position ring counter with only one position connected as an output to the forty five position ring counter 23. Said ring counter 23 is arranged such that each pulse applied to it from unit 22 steps an ON state successively from one position to the next. The arrangement is such that the ON position of said counter 23 applies a pulse of short duration to a variable delay line 24 which has forty five delay paths giving rise to delay times of $$\frac{a}{101}\tau$$

where $\tau$ is the line scanning period and a is an integer having the range of values given by $29 \leq a \leq 73$. The delay time of said delay line 24 is thus governed by the position of the ON state in the counter 23. The pulse of short duration is applied, after the selected delay in delay line 24, to one input of an OR gate 27. Said pulse is passed by the OR gate to the bright-up modulator 28 of the storage tube. Said pulse is also applied to a variable period recirculating delay line 26, which has fifty seven recirculating periods, given by $$\tau + \left(\frac{b}{101}\right)\left(\frac{\tau}{7}\right),$$

where $\tau$ is again the line scanning period and b is a second integer, having one of the range of values given by $-28 \leq b \leq 28$. The recirculation time of said recirculating delay line 26 is governed by a second counter 25, said counter having fifty seven positions. The arrangement is such that when the forty five position counter 23 has completed a full circuit and the ON state is stepped from position forty five to position one, a pulse is emitted which is applied to said fifty seven position ring counter 25 and steps an ON state from one position to the next. The position of said counter 25 which is ON is arranged to supply a pulse of long duration to enable the AND gate 29 selected by said position of said ON state. Said pulse of long duration selected by the position of said ON state is applied, therefore, to a selected AND gate 29 for a period corresponding to a full circuit of said forty five position counter 23, when the pulse emitted from said forty five position counter will step said ON state on position along in said fifty seven position counter 25 and therefore select an adjacent recirculation period of said recirculating delay line 26. Thus it is evident that this element to be sampled in the first line ($a_1$) of the charge area is selected by delay line 24 and that the elements to be sampled in the second to eighth lines inclusively are determined by the recirculating delay line 26. Therefore seven pulses from said recirculating delay line 26 are allowed to pass through gate 27 to the bright-up modulator 28 and then unit 30 clears the delay line in readiness for the arrival of a new pulse from the delay line 27.

For example, consider that the skew trajectory which is to be sampled first is that joining elements (29,1) and (1,8). This trajectory is denoted in FIG. 2 by reference $T_1$, and is the trajectory joining the twenty ninth element in line $a_1$ to the first element in line $a_8$. The circuit 22, which is being used to divide the line frequency by eight, emits its first pulse, thus stepping the ON state of said first ring counter 23 into its first position. The output pulse from the first position of said ring counter is applied to the variable delay line 24 and said pulse is delayed, in this example, by a time corresponding to $$\frac{29}{101}\tau,$$

since the only element to be sampled on the first line is the 29th. Said pulse is then applied to the OR gate 27 and thence to the bright-up modulator 28 of the storage tube. The switching of said first ring counter 23 into its first position causes the ON state of the ring counter 25 to assume its first position. In this condition the circulation time of said delay line 26 is $$t = \tau - \left(\frac{28}{101}\right)\left(\frac{\tau}{7}\right),$$

so that during the second and subsequent line scans, the bright-up pulse occurs earlier in each row by an amount according to the above equation. When eight line scans have been carried out in this manner, the subsequent line frequency pulse will activate the circuit 22 so that it emits a second pulse which steps the ON state into the second position of said ring counter 23 and this varies the delay in the variable delay line 24 by such a time that the element 30 on the first line is sampled, that is the delay time of said delay line 24 becomes $$\frac{30}{101}\tau.$$

No other changes are introduced, so that a second skew trajectory which is parallel to the first is sampled in a manner as described above. This process continues until the first ring counter 23 is in its final (forty fifth) position and the corresponding skew trajectory is sampled. On the succeeding pulse emitted from said divider circuit 22, said first ring counter 23 returns from its forty fifth position to its first position, in doing so emitting a pulse which steps said further ring counter 25 to its second position, thus modifying the recirculation time of said variable period recirculating delay line 26 to $$t = \tau - \left(\frac{27}{101}\right)\left(\frac{\tau}{7}\right),$$

which corresponds to the new trajectory joining elements (29,1) and (2,8) and subsequently the forty five trajectories parallel to this one are sampled. Thus the forty five parallel trajectories at each of said fifty seven skew angles corresponding to different target velocities are sampled and finally the charge area may be cleared to receive new information.

If more than one target is entered on the charge area of the storage tube, the eight lines corresponding to each target area are deposited beneath one another so that, for example, lines 1 to 8 correspond to one target area; lines 9 to 16 to another and so on. In the case of multiple target information being present, the circuit is arranged to sample the forty five parallel trajectories at a given skew angle on one target area and then to sample the forty five parallel trajectories on the adjacent target area instead of returning to the first line of the same target area and changing the angle of skew.

Waveform (a) of FIG. 3 shows the normal line and frame scanning waveforms applied to the tube, and waveforms (b) to (f) of FIG. 3 show the additional bright-up pulses applied to the modulator in order to sample along certain skew trajectories. In FIG. 3, waveform (b) shows the pulses required to sample along the trajectory joining elements (29,1) and (1,8); waveform (c) shows the parallel trajectory (30,1) to (2,8) and waveform (d) indicates the last trajectory parallel to the previously mentioned pair of trajectories, that joining element (73,1) to (45,8). Waveform (e) of FIG. 3 shows the pulses used to scan the trajectory following waveform (d), that is the trajectory joining (29,1) to (2,8). Waveform (f) indicates the final skew trajectory to be scanned, and shows the first and last parallel trajectories of the set at that angle, the trajectories joining element (29,1) to (57,8) and (73,1) to (101,8) respectively.

The autodetector in the receiver, when indicating the presence of an alarm worthy of classification is also required to provide an approximate indication of the strength of the alarm so that (assuming it to be a point target) the stretch gain may be set so that the potential dynamic range is fully exploited. The result of integrating along each trajectory is then applied to threshold circuit 14 which is set to a level which takes into account the mean level of returns from the spatial and temporal vicinity.

The time taken to conduct the analysis is about 25 mS. It will be appreciated that the read-out must be non-destructive and also that only the forty five original elements in the initial scan deposited on the charge area need be used as points of concurrence for the skew reading lines, as the target store 7 does not select data which does not contain a possible target, hence the first scan must contain the possible target.

Since several targets may be assessed simultaneously, the integration process associated with one target may be interrupted by the arrival of new data from another target. A maximum of fifteen targets can be assessed every second. This number of target assessments requiring a hundred and twenty storage lines on the charge area of the tube, which is within the capabilities of the type of tube specified above provided said tube is devoted entirely to this task.

As clutter due to the sea is frequently characterized by a particular velocity over a wide area, some discrimination against said clutter may be provided by the apparatus of the present invention in response to false alarms produced. A false alarm is an indication of the probable presence of a target at a particular point which when examined by the operator proves not to have a target. In a target free area, the threshold value at which an output is produced in response to the integrated total of returns along the plurality of skew trajectories is adjusted to produce indications of the presence of a target at a predetermined, average rate known as the false alarm rate. The false alarm rate is adjusted by selection of said threshold to be fairly high, say ten per second and the average true radial component of velocity of the "targets" producing false alarms is stored in said digital store. When a target having a different true radial component of velocity from the stored values is detected, an output is produced via AND gate 16 alerting the operator to the possible presence of a target, but not output is produced if the radial component of velocity conforms to the stored values of false alarm "targets", so that the apparatus can be made more sensitive to the presence of real targets and a high false alarm rate due to said sensitivity is avoided.

In an alternative arrangement, the signals representing echoes in the selected range bracket are stored on a magnetic storage drum and to perform the sampling of the fifty seven trajectories, fifty seven banks of heads are provided, appropriately orientated, the drum being rotated so that all forty five parallel trajectories at each inclination are sampled by one bank of heads.

An alternative analogue technique is to apply the outputs of compressor 10 to a matrix of transfluxers which can be then sampled.

What I claim is:

1. A target detector, including means for storing signals representing echoes received from the same range bracket and from substantially the same direction, means for integrating different combinations of elements from said echo signals, each combination being selected to include the elements which would correspond to a target moving with a particular velocity, and different combinations representing different velocities or different initial ranges, and means for signalling when the integral of any combination exceeds a threshold which indicates the presence of a target moving with the respective velocity.

2. A detector according to claim 1 in which said storage means is so arranged that signals representing successive echoes are deposited on successive lines in a storage area, signal elements representing the same range elements of successive echoes being deposited in columns, and said integrating means includes means for sampling the signal elements lying on different trajectories inclined at various angles to said columns; each trajectory representing one of said combinations.

3. A detector according to claim 2 in which the angle of inclination of a trajectory to said columns is indicative of a particular target velocity.

4. A detector according to claim 2 in which parallel trajectories are indicative of targets having the same velocity but situated at different initial ranges.

5. A detector according to claim 1 in which said storage means comprises the storage area of a charge storage cathode ray tube.

6. A detector according to claim 1 coupled to a radar receiver for feeding the signals representing echoes to said storage means, said receiver including stretch means to match the resolution of received signals to a lower resolution of the storage means.

7. A detector according to claim 1 including means for storing false alarm signals and means for comparing a subsequently obtained alarm signal with the stored false alarm signals so as to determine whether the velocity of the target causing the subsequent alarm signal is equal to the velocity of any of the apparent targets causing said false alarm signals, and means for inhibiting said signalling means if such equality occurs.

* * * * *